Sept. 11, 1934.    H. E. ADAMS    1,973,323
STUFFING BOX
Filed Jan. 26, 1932    3 Sheets-Sheet 1
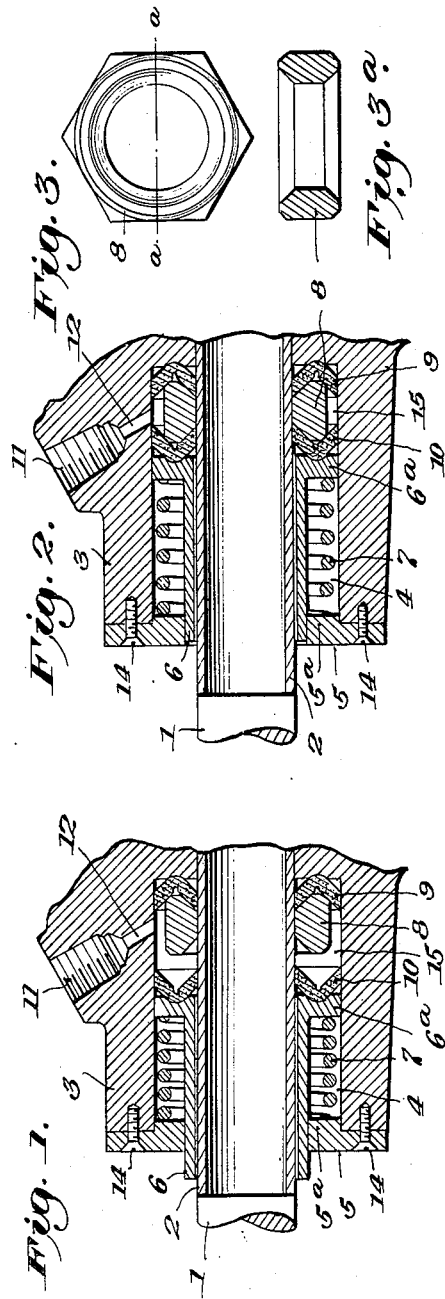
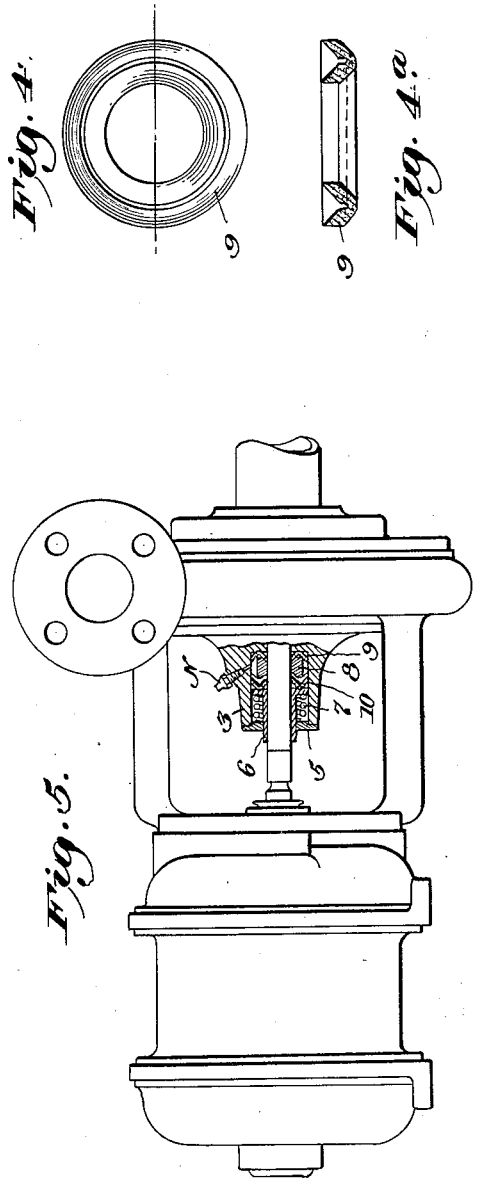
INVENTOR
HAROLD E. ADAMS
BY
ATTORNEYS Sept. 11, 1934.                H. E. ADAMS                1,973,323
                               STUFFING BOX
              Filed Jan. 26, 1932          3 Sheets-Sheet 2
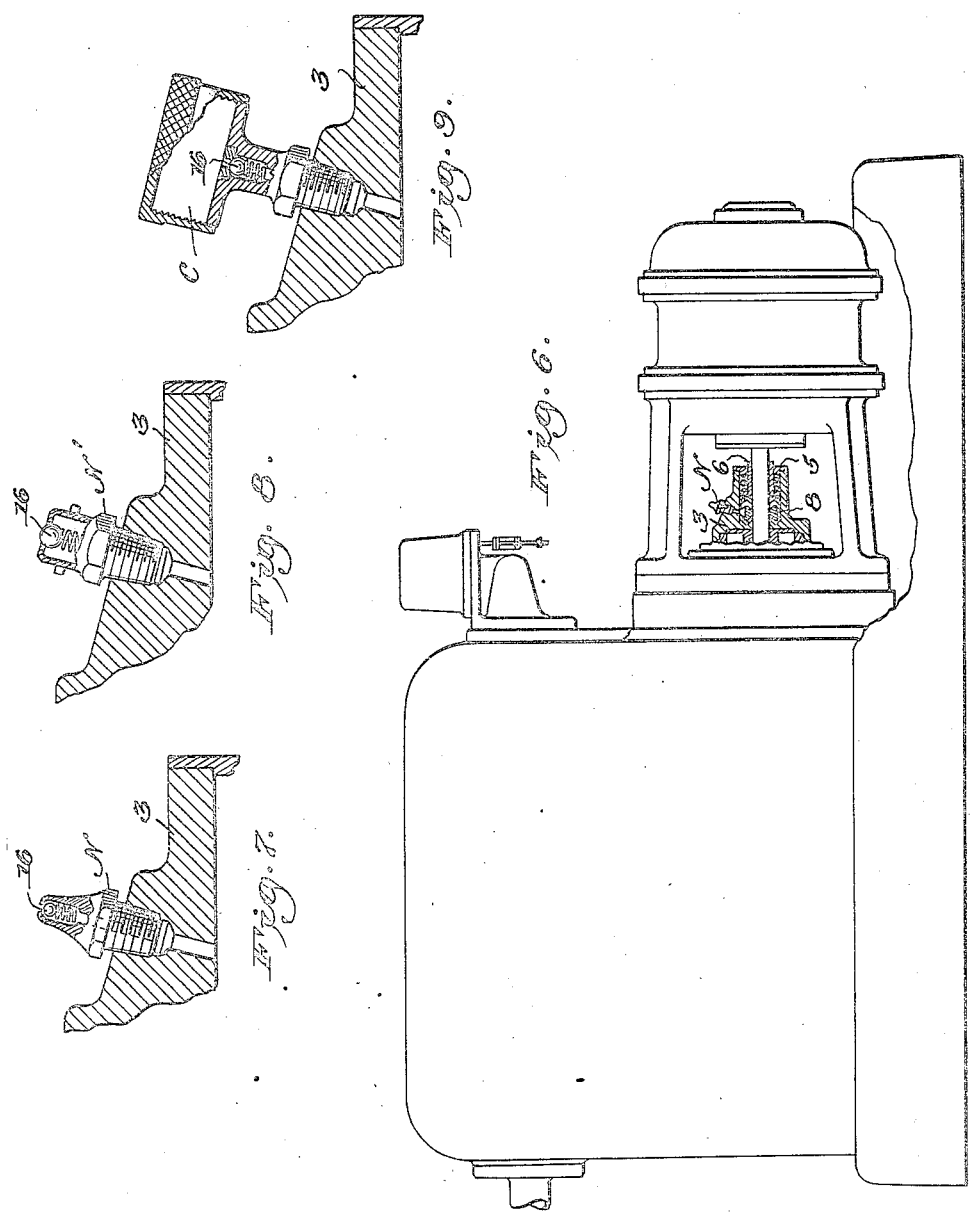
INVENTOR
HAROLD E. ADAMS,
BY
ATTORNEYS

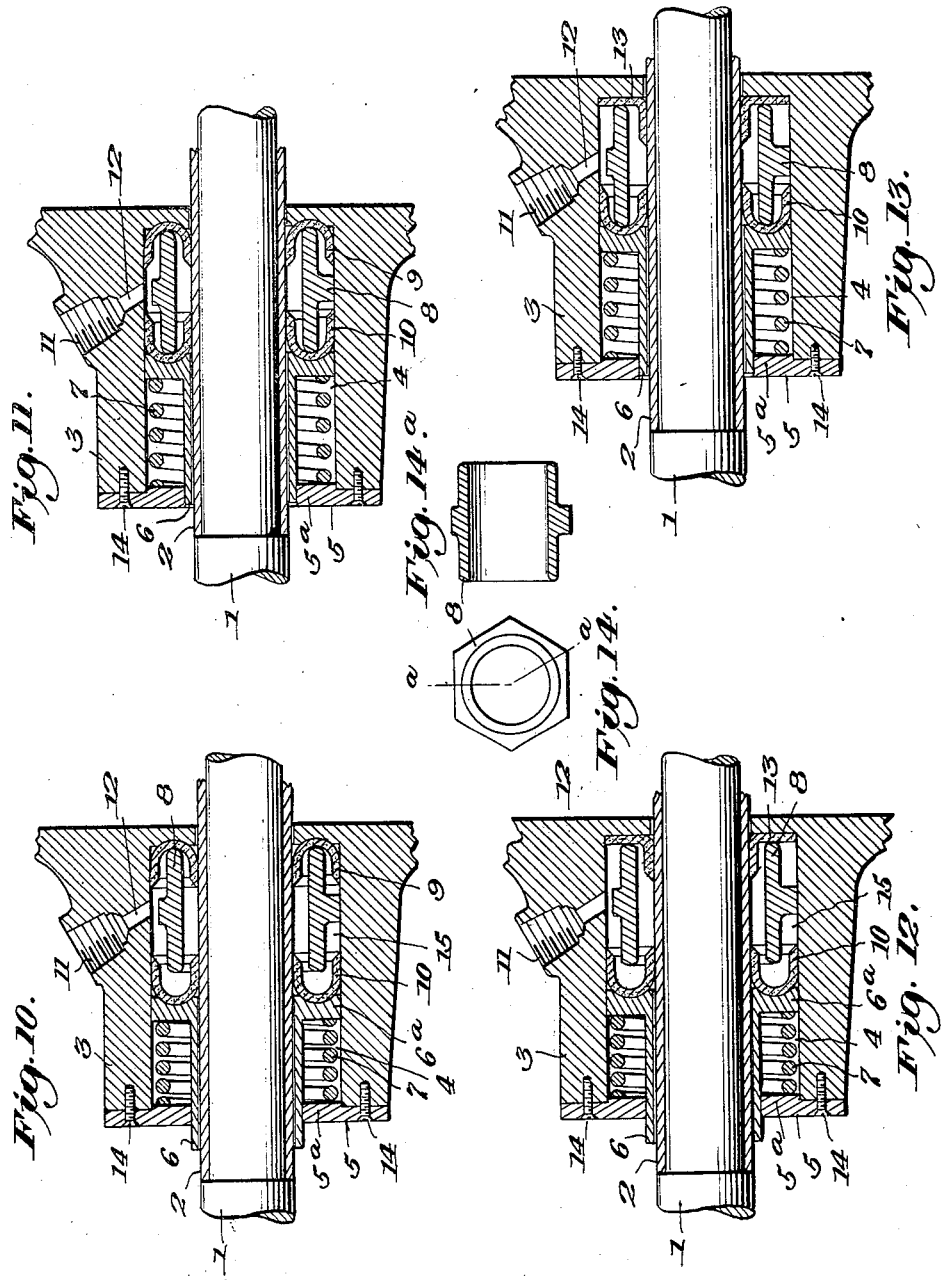

Patented Sept. 11, 1934

1,973,323

UNITED STATES PATENT OFFICE

1,973,323

STUFFING BOX

Harold E. Adams, South Norwalk, Conn., assignor to Nash Engineering Company, South Norwalk, Conn., a corporation of Connecticut Application January 26, 1932, Serial No. 589,023

4 Claims. (Cl. 286—38)

The object of this invention is to provide a new and improved stuffing box or shaft packing, which will provide a tight seal around a shaft or rod. The device is also arranged so that it will be self-lubricating.

The device consists in its main features of one or more expansible ring packings around said shaft, expanded by grease maintained under pressure.

The device will be best understood by a description of the details.

The invention is illustrated in the accompanying three sheets of drawings, in which:—

Fig. 1 is a cross sectional elevation of the parts making up the structure.

Fig. 2 is a similar view with the parts in a different position.

Fig. 3 is an end view of the spacer ring hereinafter referred to.

Fig. 3a is a cross section thereof.

Fig. 4 is an end elevation of one of the ring packings.

Fig. 4a is a cross section thereof.

Fig. 5 is an elevation partly in section illustrating the application of the invention to a motor driven centrifugal pump.

Fig. 6 is a similar view illustrating the application of the invention to a motor driven air and water pump employed in vacuum steam heating.

Fig. 7 is an elevation partly in section illustrating a form of nipple through which the grease can be supplied under pressure.

Fig. 8 is a similar view of a modified form.

Fig. 9 is a sectional view illustrating how grease under pressure can be supplied by a grease cup.

Figs. 10 and 11 are views similar to Figs. 1 and 2 illustrating a modification.

Figs. 12 and 13 are views similar to Figs. 1 and 2, illustrating a still further modification.

Fig. 14 is an end view, and

Fig. 14a is a sectional view of the spacer ring which is used in the construction shown in Figs. 12 and 13.

Referring to the first sheet of drawings, 1 designates a shaft or rod. A bronze bushing 2 is preferably, but not always, placed on the shaft. 3 designates a hub which forms the body of the stuffing box, which hub can be formed with or attached to the body of the machine to which the improvement is applied. This hub has a bore 4 of an internal diameter considerably larger than the diameter of shaft 2 to leave an annular chamber between the shaft and hub. An end plate 5 having a centering hub 5a is secured on the end of the hub 3 by cap screws 14. A follower gland or bushing 6 is placed on the shaft 1. This gland has a head 6a which fits tightly in the bore 4, while the gland itself is fitted with a little clearance on the shaft. The gland 6 also fits tightly in plate 5. The purpose of this arrangement is to center the gland 6 accurately and to provide for clearance between the gland and the shaft so that friction will be eliminated.

The follower gland 6 is pressed to the right, as illustrated in the figures, by a heavy spring 7 arranged between plate 5 and head 6a. Ring packings 9 and 10 are arranged at the right of the follower gland. These rings are made out of suitable material, and as illustrated in Figures 1 and 2 are V-shaped in cross section so that they will expand by pressure applied laterally in the V's. A spacer ring 8 is placed on the shaft between the packing rings 9 and 10. A hole 11 is drilled in the hub 3 and the same is connected by a passage 12 to the space between the ring packings 9 and 10. The hole 11 is screw-threaded and secured in the same is a pressure nipple N, Fig. 7, or N', Fig. 8, having a spring pressed ball check valve 16, through which grease may be forced under pressure into hub 3. A grease cup C may be used instead of a nipple, as shown in Fig. 9.

The relation of the above parts at the time of assembly is shown in Fig. 2. When the structure is used on a water pump, as illustrated in Fig. 5, a water proof grease is injected through passage 12 into the pressure chamber 15 between the two ring packings 9 and 10. This grease is forced in under pressure sufficient to force the gland 6 outwardly to its fullest extent against the pressure of the spring 7. This will charge or load the stuffing box. The spring 7 is made of a size to exert a pressure on the gland head 6a materially higher than any pressure which may exist in the pump itself, or in case the improvement is used in connection with a vacuum pump to exceed materially the total barometric pressure.

Because of the pressure constantly maintained in chamber 15 by the action of the spring 7, the pressure always tends to maintain the legs of the ring packings 9 and 10 firmly seated against the bore 4 of the stuffing box 3 and against the shaft 1. This effect may be obtained with one ring packing but it is usually better to employ two as illustrated. The grease in the pressure chamber under constant pressure operating in this way forms a very effective seal. The seal is tight not only against inward or outward leakage, but the seal is obtained with a minimum of friction on the shaft with consequent increased efficiency, due to decreased power loss in the stuffing box.

The gland 6 also acts as an indicator to show the amount of grease in the chamber 15. When the end of the gland is flush with plate 5, it is an indication that it is necessary to refill the chamber through the high pressure grease connection. The amount that gland 6 protrudes beyond the face of plate 5 gives an indication of the amount of grease in chamber 15 at any time.

The constant follow up pressure exerted by the spring 7 and gland 6 within the chamber 15 is always sufficient to maintain the tight seal between the sealing rings and the shaft 4, under all conditions.

The ring packings 9 and 10 are prevented from coming together by a spacer ring 8. If grease should escape from the chamber 15 the ring packings will still be held in engaging contact with the shaft by the wedging action of the sides of the spacer ring 8 and the pressure exerted by the spring 7. This condition while not as effective as the normal operation of the stuffing box, will help keep the seal tight in the case of inattention.

It will also be noticed that in case the pump is shut down, the tight seal will be maintained.

In Figs. 10 and 11 the ring packings 9 and 10 are made semi-circular in cross section and the spacer ring is made in the form of a cylinder having a nut on its outer surface and the ends of the ring are rounded to engage these particular shaped packings.

In Figs. 12 and 13 the right hand ring packing is made right angled in shape, the upper part thereof engaging the end of the bore 4.

The parts can be made in many other forms and shapes to accomplish the purpose stated.

The improved stuffing box also will work admirably to seal a reciprocating shaft.

The details and arrangements herein shown and described may be greatly varied by a skilled mechanic without departing from the scope of my invention as expressed in the claims.

Having thus fully described my invention, what I claim and desire to secure by Letters Patent is:—

1. A stuffing box comprising a hub surrounding a shaft and spaced therefrom to leave an annular chamber between the shaft and hub, two expansible ring packings in said chamber, a follower engaging one of said packings, a spring for constantly forcing said follower towards said packings, connections whereby grease can be forced into the chamber between said packings and the follower gland moved against the pressure of said spring, and spacing means in said chamber, disposed between said rings, said spacing means being shaped to expand said expansible rings.

2. A stuffing box comprising a hub surrounding a shaft and spaced therefrom to leave an annular chamber between the shaft and hub, a pair of expansible ring packings in said chamber, a follower gland loosely fitted on the shaft and having a head tightly fitting the hub, a spring for constantly pushing said gland against one of said packings, means whereby grease can be forced under pressure into said chamber between said ring packings and spacing means in said chamber, disposed between said rings and directly engageable therewith, said spacing means being shaped to expand said expansible rings.

3. A stuffing box comprising a hub surrounding a shaft and spaced therefrom to leave an annular chamber between the shaft and hub, two ring packings in said chamber, a spacer ring between said packings shaped to expand same, a spring pressed follower gland engaging one of said packings and connections whereby grease can be forced into and kept under pressure in said chamber.

4. A stuffing box comprising a hub surrounding a shaft and spaced therefrom to leave an annular chamber between the shaft and hub, an expansible ring packing in said chamber, a spring pressed follower gland engaging said packing, an end plate attached to said hub, said follower having an extension projecting through said plate, and connections whereby grease can be forced into said chamber, said extension of the follower gland beyond the plate being effective to indicate the amount of grease in the chamber.

HAROLD E. ADAMS.